April 16, 1957   C. B. SPASE ET AL   2,788,876
CLUTCH RELEASE MECHANISM
Filed Dec. 8, 1953   3 Sheets-Sheet 3
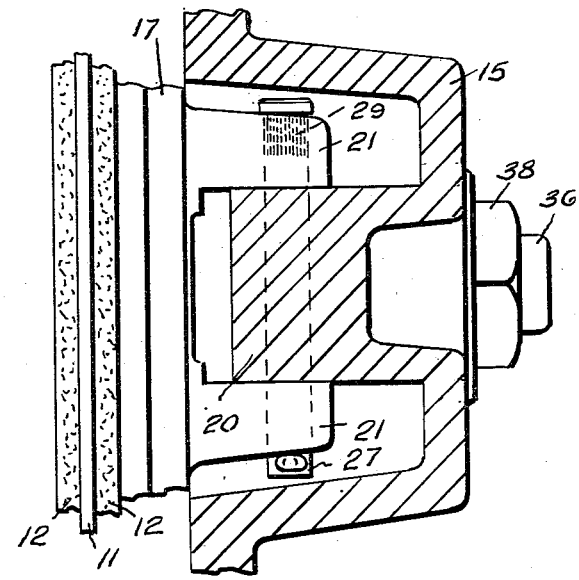
Fig-3-
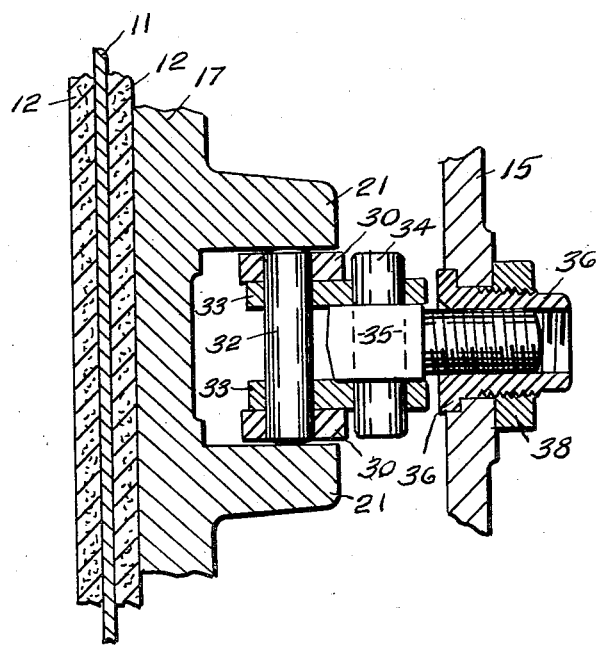
Fig-4-
INVENTORS.
Charles B. Spase & Robert S. Root
BY
D. Emmett Thompson
ATTORNEY.

United States Patent Office 2,788,876
Patented Apr. 16, 1957

2,788,876
CLUTCH RELEASE MECHANISM

Charles B. Spase, Nedrow, and Robert S. Root, Westvale, N. Y., assignors to Lipe-Rollway Corporation, Syracuse, N. Y., a corporation of New York Application December 8, 1953, Serial No. 396,862

1 Claim. (Cl. 192—99)

This invention relates, in general, to friction clutches of the type commonly used in the automotive industry including driving and driven members, a spring pressed pressure plate and a back plate.

More particularly, the invention has to do with the release mechanism which consists generally of a series of release levers connected to the pressure plate and the back plate, and which are actuated by a conventional throw-out collar to release the pressure between the back plate and the driven member to disengage the driven member therefrom.

The invention has as an object a clutch release mechanism embodying a mounting structure for the release levers whereby the levers are mounted for free pivotal movement for actuation of the pressure plate without effecting any radial displacement of the pressure plate.

The invention consists in the novel features and in the combinations and constructions hereinafter set forth and claimed.

In describing this invention, reference is had to the accompanying drawings in which like characters designate corresponding parts in all the views.

In the drawings—

Figure 3 is a fragmentary, sectional view taken on line 3—3, Figure 1.

Figure 4 is a fragmentary, sectional view taken on line 4—4, Figure 1.

Figure 1:
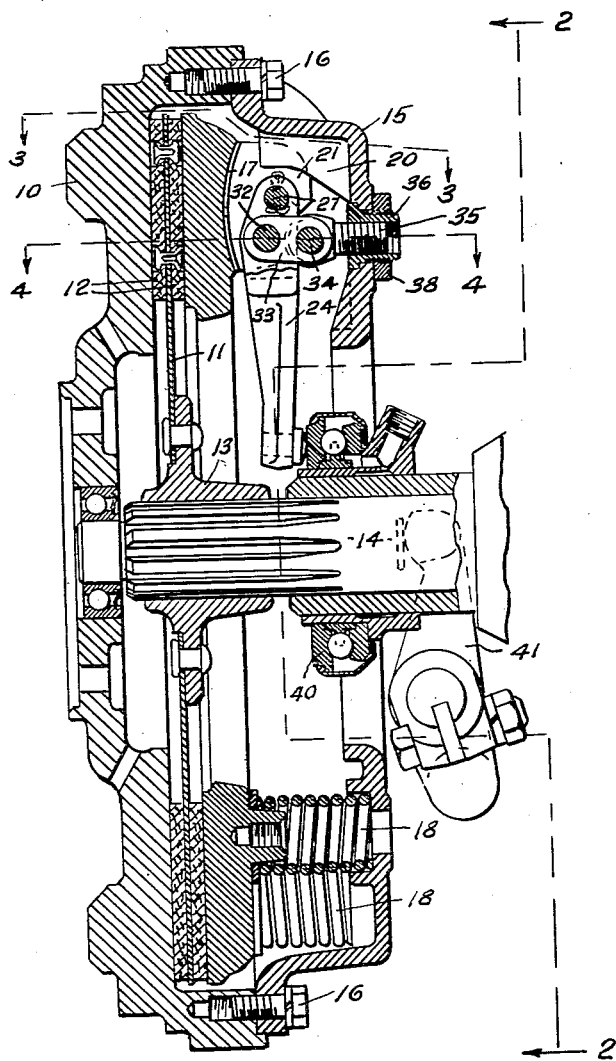
Figure 1 is a vertical sectional view of a clutch embodying my invention.

The driving member of the clutch is shown in the form of a circular body 10 adapted to be fixedly mounted on the rear end of the crank shaft of a motor vehicle engine, this member usually constituting the fly wheel of the engine. The driven member 11 is in the form of a clutch disk provided with annular friction faces 12, the driven disk being carried by a hub 13 mounted on the splined portion of the driven shaft 14 extending rearwardly to the transmission. The driving member further includes a back plate 15 fixedly secured at its periphery to the fly wheel 10, as by screws 16. A pressure plate 17 is mounted between the body 10 of the driving member and the back plate 15 thereof, and is urged toward the body 10 by compression springs 18 interposed between the pressure plate and the back plate.

A driving connection is established between the back plate 15 and the pressure plate 17 by lugs 20 formed on the inner surface of the pressure plate 15 and lugs 21 formed on the rear surface of the pressure plate adjacent the periphery thereof. The lugs 21 on the pressure plate are formed in pairs, and the lugs 20 on the pressure plate are arranged intermediate the lugs 21 of each pair on the pressure plate, see Figure 3.

Figure 2:
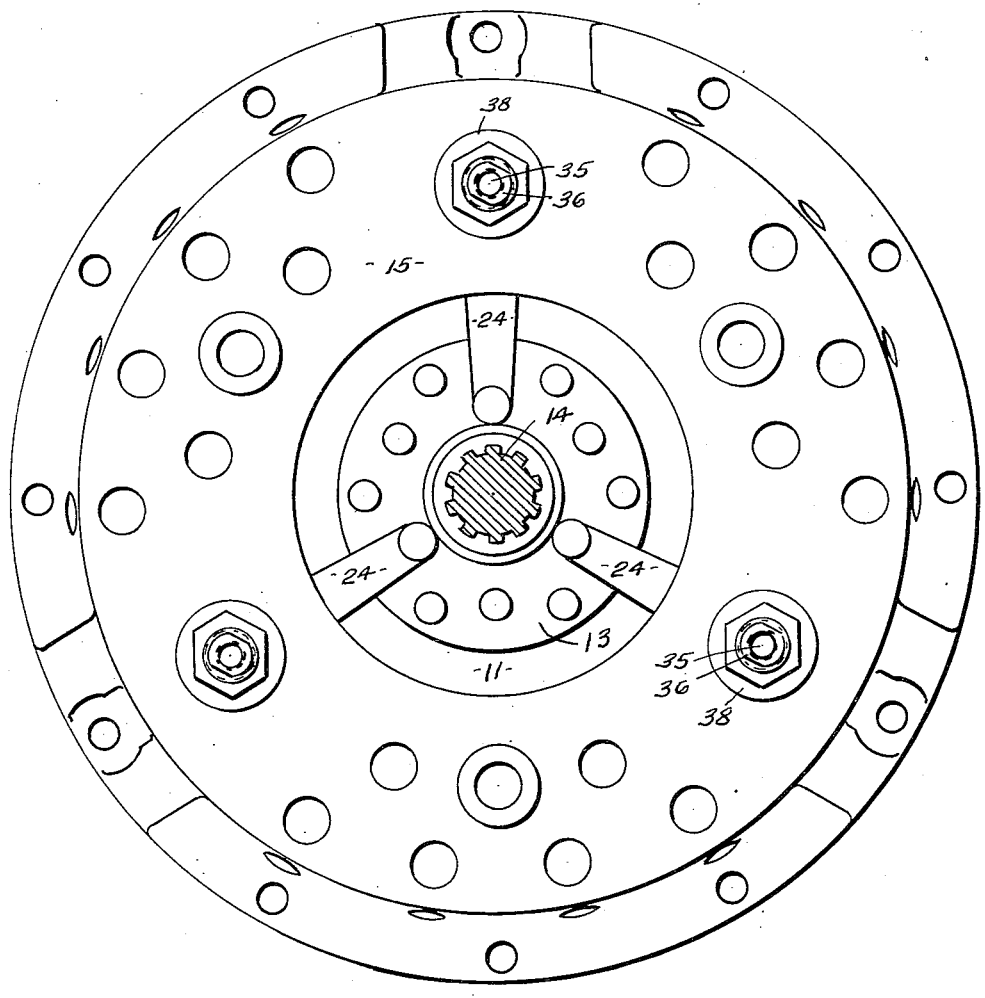
Figure 2 is a view taken on line 2—2, Figure 1.

The clutch is released by moving the pressure plate rearwardly, or away from the fly wheel 10, by a series of levers 24, there being three of these levers in the construction shown, see Figure 2.

The levers 24 are pivotally mounted at their outer ends on pins 27 extending through the pressure plate bosses 21. The pins 27 are knurled, or serrated, on their surfaces, as indicated at 29, Figure 3, to restrain any rotative movement of the pins of the bosses 21, to eliminate wear in the pin holes in the bosses 21. The outer end portions of the levers 24 are bifurcated to provide spaced apart portions 30 through which the pivot pins 27 extend. These portions 30 of the levers are also apertured to receive pivot pins 32 which also extend through links 33, the opposite ends of the links being pivotally mounted on pins 34 carried by supporting studs extending forwardly from the back plate 15. As here shown, the supporting studs are in the nature of eye bolts 35, the shanks of which are threaded into sleeves 36 mounted for rotation in apertures formed in the back plate 15. The outer ends of the sleeves 36 are formed with flat surfaces 37 for the reception of a wrench to effect rotation of the sleeves to adjust the eye bolts axially toward and from the body 10 of the driving member. The sleeves are locked in the back plate 15 by jam nuts 38. The pivot pins 32, 34, are located substantially on the same radius from the axis of the driving and driven members.

The inner ends of the levers 24 are engaged by a throw-out collar 40 slidably mounted upon the driven shaft 14 and actuated by the conventional yoke structure 41. Forward movement of the collar 40 effects pivotal movement of the levers 24 about the pivot pins 32, moving the pressure plate 17 rearwardly against the action of springs 18, thus releasing the driven disk 11.

Due to the fact the links 33 are free to move about pins 34 and the pivot pins 32 are permitted to have movement radially of the clutch, there is no binding or cramping of the parts of the release mechanism.

With the throw-out levers 24 pivotally mounted upon the pressure plate, centrifugal force developed in the levers at high speed rotation of the clutch is transmitted directly to the pressure plate which represents the strongest and heaviest member of the clutch assembly, thus avoiding this force being applied to the cover plate 15. This arrangement of mounting the throw-out levers and including the connecting links 33 tends to reduce the throw-out pressure required to release the clutch. In fact, as the clutch facings 12 wear, permitting the inner ends of the levers to move outwardly from the driving member, the centrifugal action supplements the pressure springs 18 without the necessity of adding weighted portions to the throw-out levers, whereby the over-all weight and the cost of the clutch structure is materially reduced.

What we claim is:

A release mechanism for friction clutches of the type having axial alined driving and driven members, the driving member consisting of a body, a back plate attached in axial spaced relation to the body and a pressure plate positioned between the body and the back plate and being spring pressed axially toward the body, said mechanism comprising a series of levers pivotally connected at their outer ends to the rear side of said pressure plate adjacent the periphery thereof and extending radially inwardly from said pivots, a sleeve rotatably mounted in the back plate in juxtaposition to the outer end portion of each of said levers, each of said sleeves being threaded externally and having a shoulder engaging the inner surface of the back plate, a stud threaded into each of said sleeves, said studs extending parallel to the axis of the clutch structure, a link pivotally connected at one end to the inner end of each of said studs, said links being pivotally connected at their opposite ends to said levers, and a lock nut threaded on each of said sleeves for engagement with the outer surface of the back plate.

References Cited in the file of this patent

UNITED STATES PATENTS

| | | |
|---|---|---|
| 1,507,518 | Rose | Sept. 2, 1924 |
| 2,171,385 | Zeidler | Aug. 29, 1939 |
| 2,259,784 | Spase | Oct. 21, 1941 |
| 2,496,411 | Root | Feb. 7, 1950 |